US 010377896B2

United States Patent
Georgelos et al.

(10) Patent No.: US 10,377,896 B2
(45) Date of Patent: *Aug. 13, 2019

(54) BIOPOLYMER ROLL STOCK FOR FORM-FILL-SEALED ARTICLE

(71) Applicant: CLEAR LAM PACKAGING, INC., Elk Grove Village, IL (US)

(72) Inventors: Paul Georgelos, Naperville, IL (US); Pat Montefusco, Genoa, IL (US); Jeanne M. Skaggs, Arlington Heights, IL (US); Bohdan Wyslotsky, Algonquin, IL (US)

(73) Assignee: Sonoco Development Inc., Hartsville, SC (US)

( * ) Notice: Subject to any disclaimer, the term of this patent is extended or adjusted under 35 U.S.C. 154(b) by 475 days.

This patent is subject to a terminal disclaimer.

(21) Appl. No.: 15/133,131

(22) Filed: Apr. 19, 2016

(65) Prior Publication Data
US 2016/0230002 A1    Aug. 11, 2016

Related U.S. Application Data

(63) Continuation of application No. 13/069,327, filed on Mar. 22, 2011, now Pat. No. 9,321,549.
(Continued)

(51) Int. Cl.
*B65D 1/30*    (2006.01)
*C08L 67/04*   (2006.01)
(Continued)

(52) U.S. Cl.
CPC .............. *C08L 67/04* (2013.01); *B32B 27/08* (2013.01); *B32B 27/18* (2013.01); *B32B 27/20* (2013.01);
(Continued)

(58) Field of Classification Search
CPC .. C07D 409/06; C07D 405/06; C07D 401/06; C07D 333/22; C07D 295/192;
(Continued)

(56) References Cited

U.S. PATENT DOCUMENTS 5,252,642 A   10/1993  Sinclair et al.
5,589,544 A   12/1996  Horrion
(Continued)

FOREIGN PATENT DOCUMENTS

CN   101402786 A   4/2009
CN   101541853 A   9/2009
(Continued)

OTHER PUBLICATIONS

"Enhancing Biopolymers: Additives Are Needed for Toughness, Heat Resistance and Processability", Plastics Technology, Jul. 2008.
(Continued)

*Primary Examiner* — James C Yager
(74) *Attorney, Agent, or Firm* — Marshall, Gerstein & Borun LLP

(57) ABSTRACT

A system and method for forming a biopolymer roll stock for a biopolymer form-fill-sealed package, the biopolymer roll stock includes at least one biopolymer resin; and at least one additive, the additive including at least one impact modifier between 5-50 weight % of the total weight of the additive; and at least one polymer color concentrate between 5-50 weight % of the total weight of the additive, whereby the biopolymer roll stock has a predetermined thickness and impact resistance.

14 Claims, 7 Drawing Sheets

Related U.S. Application Data

(60) Provisional application No. 61/316,313, filed on Mar. 22, 2010.

(51) Int. Cl.
  *B32B 27/18* (2006.01)
  *B32B 27/20* (2006.01)
  *B32B 27/36* (2006.01)
  *C08J 3/22* (2006.01)
  *C08L 23/08* (2006.01)
  *C08L 67/02* (2006.01)
  *B32B 27/08* (2006.01)
  *B32B 27/32* (2006.01)
  *C08K 3/22* (2006.01)

(52) U.S. Cl.
  CPC ............ *B32B 27/32* (2013.01); *B32B 27/36* (2013.01); *B65D 1/30* (2013.01); *C08J 3/226* (2013.01); *C08L 23/08* (2013.01); *C08L 67/02* (2013.01); *B32B 2250/24* (2013.01); *B32B 2307/558* (2013.01); *B32B 2307/7163* (2013.01); *B32B 2307/732* (2013.01); *B32B 2439/00* (2013.01); *B32B 2439/70* (2013.01); *B32B 2553/00* (2013.01); *C08J 2367/04* (2013.01); *C08J 2423/08* (2013.01); *C08J 2467/04* (2013.01); *C08K 3/22* (2013.01); *C08K 2003/2241* (2013.01); *C08L 2205/03* (2013.01); *C08L 2310/00* (2013.01); *Y10T 428/31931* (2015.04)

(58) Field of Classification Search
  CPC .. C07D 215/14; C07D 213/50; C07D 307/52; C08L 67/04; C08L 23/08; C08L 67/02; C08L 2310/00; C08L 2205/03; C08J 3/226; C08J 2423/08; C08J 2367/04; C08J 2467/04; B32B 27/08; B32B 27/32; B32B 27/36; B32B 27/20; B32B 27/18; B32B 2307/558; B32B 2553/00; B32B 2439/70; B32B 2250/24; B32B 2307/7163; B32B 2307/732; B32B 2439/00; B65D 1/30; C08K 2003/2241; C08K 3/22; Y10T 428/31931
  See application file for complete search history.

(56) References Cited

U.S. PATENT DOCUMENTS

| | | |
|---|---|---|
| 5,782,376 A | 7/1998 | Brauner et al. |
| 5,874,486 A | 2/1999 | Bastioli et al. |
| 5,883,199 A | 3/1999 | McCarthy et al. |
| 6,020,414 A | 2/2000 | Nelsen et al. |
| 6,312,639 B1 | 11/2001 | Ertle et al. |
| 6,329,465 B1 | 12/2001 | Takahashi et al. |
| 6,495,656 B1 | 12/2002 | Haile et al. |
| 6,872,674 B2 | 3/2005 | Williams et al. |
| 6,916,770 B2 | 7/2005 | Nitzsche |
| 6,943,214 B2 | 9/2005 | Flexman |
| 7,160,977 B2 | 1/2007 | Haile et al. |
| 7,381,772 B2 | 6/2008 | Flexman et al. |
| 7,595,363 B2 | 9/2009 | Uradnisheck et al. |
| 7,902,274 B2 | 3/2011 | Prusak et al. |
| 9,321,549 B2 | 4/2016 | Georgelos et al. |
| 2004/0164076 A1 | 8/2004 | Baker et al. |
| 2004/0242803 A1 | 12/2004 | Ohme et al. |
| 2005/0011898 A1 | 1/2005 | Van Handel et al. |
| 2005/0038189 A1 | 2/2005 | Takimoto et al. |
| 2005/0137332 A1 | 6/2005 | Hale et al. |
| 2005/0137356 A1 | 6/2005 | Hale et al. |
| 2005/0154114 A1 | 7/2005 | Hale |
| 2006/0173133 A1 | 8/2006 | Flexman et al. |
| 2007/0131904 A1 | 6/2007 | Crossland |
| 2007/0179218 A1 | 8/2007 | Brake et al. |
| 2007/0299212 A1 | 12/2007 | Smillie |
| 2008/0027178 A1 | 1/2008 | Uradnisheck |
| 2008/0038560 A1 | 2/2008 | Knoerzer et al. |
| 2008/0085959 A1 | 4/2008 | Mueller et al. |
| 2008/0119589 A1 | 5/2008 | Majewski et al. |
| 2009/0005514 A1 | 1/2009 | Uradnisheck et al. |
| 2009/0008819 A1 | 1/2009 | Ozasa et al. |
| 2009/0099313 A1 | 4/2009 | Uradnisheck |
| 2009/0156732 A1 | 6/2009 | Rajaraman et al. |
| 2009/0162683 A1 | 6/2009 | Douard |
| 2009/0169844 A1 | 7/2009 | Yamamura et al. |
| 2009/0191371 A1 | 7/2009 | Uradnisheck |
| 2009/0209704 A1 | 8/2009 | Uradnisheck |
| 2009/0281203 A1 | 11/2009 | Riebel et al. |
| 2009/0311544 A1 | 12/2009 | Lee et al. |
| 2010/0028512 A1 | 2/2010 | Kriegel et al. |
| 2010/0133644 A1 | 6/2010 | Hebert |
| 2010/0280193 A1 | 11/2010 | Kobayashi et al. |
| 2011/0218308 A1 | 9/2011 | Nozue et al. |
| 2011/0226789 A1 | 9/2011 | Georgelos et al. |
| 2012/0142823 A1 | 6/2012 | Cygan et al. |

FOREIGN PATENT DOCUMENTS

| | | |
|---|---|---|
| EP | 2065435 A1 | 6/2009 |
| JP | 2003-119352 A | 4/2003 |
| JP | 2009-169577 A | 7/2009 |
| WO | WO-2005/063881 A1 | 7/2005 |
| WO | WO-2005/063883 A1 | 7/2005 |
| WO | WO-2007/027027 A1 | 3/2007 |
| WO | WO-2007/129893 A1 | 11/2007 |
| WO | WO-2009/070858 A1 | 6/2009 |
| WO | WO-2010/127341 A1 | 11/2010 |

OTHER PUBLICATIONS

"Functionalized Polymers", DuPont, downloaded from the Internet at: <http://www.web.archive.org/web/20081219011941/http://www2.dupont.com/Directories/en_US/Products_Services_Index/Plastics_Polymers_Elastomers/Functionalized_Polymers.html> (Dec. 19, 2008).
"Impact Modifiers: How to Make Your Compound Tougher, Plastics, Additives and Compounding", vol. 6, Issue 3, May-Jun. 2004, pp. 46-49.
"Titanium Dioxide", Wikipedia, downloaded from the Internet at: <http://web.archive.org/web/20090226124501/http:en.wikipedia.org/wiki/Titanium_dioxide).
Cybulski, Plastic Conversion Processes: A Concise and Applied Guide, pp. 23, 28 and 29, Boca Raton, FL: Taylor Francis (2009).
Extended European Search Report, European patent application No. 11760081.7, dated Mar. 1, 2017.
Nolan-ITU, "Environment Australia Biodegradable Plastics-Developments and Environmental Impacts", Oct. 2002.
Notice of Reasons for Refusal (English translation), Japanese patent application No. 2013501404, dated Dec. 9, 2014.
PCT/US/11/29473 International Search Report and Written Opinion of the International Searching Authority (dated May 19, 2011).
PCT/US11/29453, International Search Report and Written Opinion of the International Searching Authority, dated May 23, 2011.
Third Office Action (English translation), Chinese patent application No. 201180025238.4, dated Feb. 28, 2015.
Third Office Action (English translation), Chinese patent application No. CN201180025266.6, dated Mar. 17, 2015.
Srithep et al., Processing and Characterization of Recycled Poly(ethylene terephthlate) Blends with Chain Extenders (CE), Thermoplastic Elastomers (TPE), and/or Poly(butylene adipate-co-terephthalate (PBAT), Final Report, University of Wisconsin System Solid Waste Research Program, University of Wisconsin (2010).
Liao et al., Diffusion of $CO_2$ molecules in polyethylene terephthalate/polylactide blends estimated by molecular dynamics simulations, Bulletin of Korean Chemical Society, vol. 34, No. 3, pp. 753-758 (2013).

US 10,377,896 B2

BIOPOLYMER ROLL STOCK FOR FORM-FILL-SEALED ARTICLE

CROSS REFERENCE TO RELATED APPLICATIONS

This application is a continuation of U.S patent application Ser. No. 13/069,327 filed Mar. 22, 2011, which claims the benefit of priority to U.S Provisional Application No. 61/316,313 filed Mar. 22, 2010, the respective disclosures of which are each incorporated herein by reference in their entireties.

FIELD OF THE INVENTION

The invention relates to roll stock. More particularly, to biopolymer roll stock used for biopolymer form-filled-sealed articles or packages.

BACKGROUND OF THE INVENTION

Currently petroleum-based polymers or non-biodegradable materials and sheeting are used to form rigid structures. Such materials are not readily degradable and are therefore considered undesirable. One approach to this problem has been to use biopolymer sheeting to form such rigid structures. Unfortunately, current biopolymer sheeting is not suitable for forming such rigid structures, in that such current biopolymer sheeting is not useful for forming rigid structures having the desired depth to width ratios within the desired temperature forming windows and are further unsuitable for cutting and scoring using currently available machinery as required by the packaging industry to produce such rigid structures.

For the foregoing reasons, it would be desirable to have a biopolymer roll stock used in biopolymer form-fill-sealed articles or packages.

SUMMARY OF THE INVENTION

One embodiment of the present invention relates to biopolymer roll stock. The biopolymer roll stock includes at least one biopolymer resin; and at least one additive, the additive including at least one impact modifier between 5-50 weight % of the total weight of the additive; and at least one polymer color concentrate between 5-50 weight % of the total weight of the additive, whereby the biopolymer roll stock has a predetermined thickness and impact resistance.

Yet another embodiment relates to a biopolymer roll stock, the biopolymer roll stock including at least one biopolymer resin; and at least one additive. The additive includes at least one impact modifier between 10-90 weight % of the total weight of the additive; and at least one polymer/dye compounded in a carrier resin between 10-90 weight % of the total weight of the additive, whereby the biopolymer roll stock has a predetermined thickness and impact resistance and forms a biopolymer form-filled-sealed article having predetermined depth to width ratio within a predetermined temperature window and is adapted to be cut and/or scored.

Still another embodiments relates to a biopolymer form-fill-sealed package including at least one biopolymer resin between 75-92 weight % of the total weight percent of the biopolymer form filled sealed package; and at least one additive between 8-25 weight % of the total weight percent of the biopolymer form filled seal article. The at least one additive includes at least one impact modifier between 5-50 weight % of the total weight of the additive; at least one polymer color concentrate between 5-50 weight % of the total weight of the additive; and at least one carrier resin between 10-90 weight % of the total weight of the additive; whereby the biopolymer form-fill-sealed package has a predetermined thickness, impact resistance and a predetermined depth to width ratio within a predetermined temperature window.

Still one other embodiment relates to a method of forming a biopolymer form-fill-sealed package, the method including providing at least one impact modifier, at least one polymer color concentrate and at least one carrier resin; blending the at least one impact modifier, the at least one polymer color concentrate and the at least one carrier resin forming an additive blend, wherein the at least one impact modifier is between 10-90 weight % of the total weight of the additive blend, the at least one polymer color concentrate is between 5-50 weight % of the total weight of the additive blend and the at least one carrier resin is between 5-50 weight % of the total weight of the additive blend. At least one biopolymer resin is blended with the additive blend forming a biopolymer roll stock at a predetermined thickness and impact resistance; and forming the biopolymer form-fill-sealed package from the biopolymer roll stock. In one or more embodiments, the biopolymer form-fill-sealed package has a predetermined depth to width ratio within a predetermined temperature window and/or is adapted to be cut and/or scored.

In one or more embodiments, the biopolymer roll stock includes the at least one biopolymer resin is between 75-92 weight % (alternatively 70-90 weight %) of the total weight percent of the biopolymer roll stock; and the at least one additive is between 8-25 weight % of the total weight percent of the biopolymer roll stock. Although 8 weight % is disclosed, less than 8 weight % is contemplated.

Embodiments of the biopolymer roll stock include the at least one impact modifier is an ethylene copolymer and/or the at least one polymer color concentrate is $TiO_2$ based.

Yet one or more embodiments include the at least one carrier resin is a material selected from the group consisting of polylactic acid polymer (PLA), aliphatic-aromatic polyesters polymers, poly (3-hydroxyalkanoate) polymer (PHA), polycaprolactone and functionalized polylactic acid; and/or the biopolymer resin is a material selected from the group consisting of polylactic acid polymer (PLA), aliphatic-aromatic polyesters polymers, and poly (3-hydroxyalkanoate) polymer (PHA).

Embodiments the predetermined thickness of the biopolymer roll stock is between about 10 MILs and 80 MILs. Further, the biopolymer roll stock may be comprised of at least two layers of materials. The at least two layers of materials may be comprised of the same material; are comprised of different materials; are comprised of different biopolymer materials or are comprised of biopolymer material and non-biopolymer material. Other embodiments include joining the biopolymer sheeting to at least one other sheeting material.

One or more embodiments include the predetermined impact resistance has a Gardner Impact value between 3 and 30 in-lbs (greater than 17 in-lb for example). More specifically the predetermined impact resistance has a Gardner Impact value of about 17 in-lbs @ 30 MILs. One or more embodiments may include the predetermined thickness is between about 10 MILs and 80 MILs thick. Still one or more embodiments may include the predetermined temperature forming window is between 180° F. and 350° F. (between 220° F. and 275° F. for example) and the predetermined depth to width ratios having ranges of 10:1 to 1:4, where embodiments are contemplated having ranges of depth to width ratios of 10:1 to 2:1, ranges of depth to width ratios of 8:1 to 4:1, and ranges of depth to width ratios of 2:1 to 1:4, and the article may be scored for separation into individual compartments. In at least one embodiment, the roll stock/article has a Shard Test value of about 0.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

Figure 1:
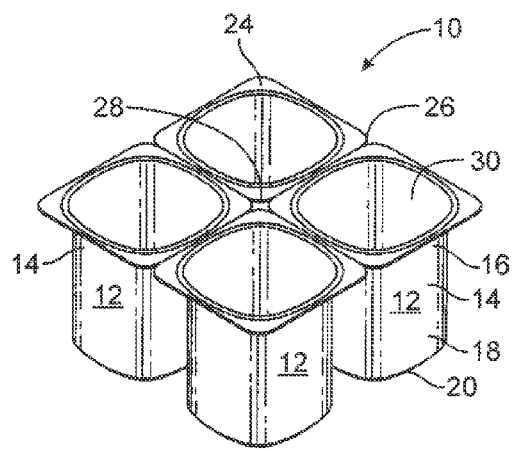
FIG. 1 is a view of a biopolymer article in accordance with one embodiment.
Figure 2:
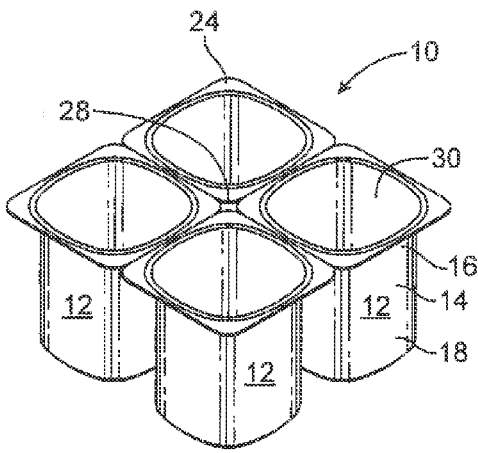
FIG. 2 is another view of the biopolymer article of FIG. 1 in accordance with one embodiment.
Figure 3:
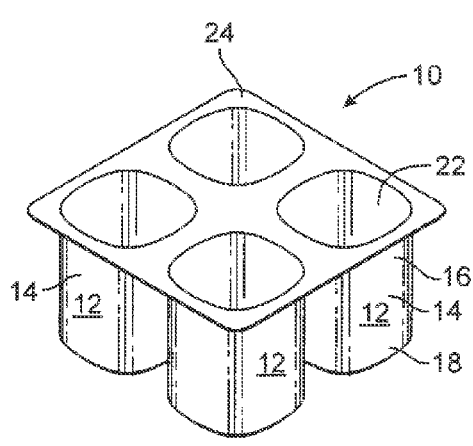
FIG. 3 is yet another view of a biopolymer article of FIG. 1 in accordance with one embodiment.
Figure 4:
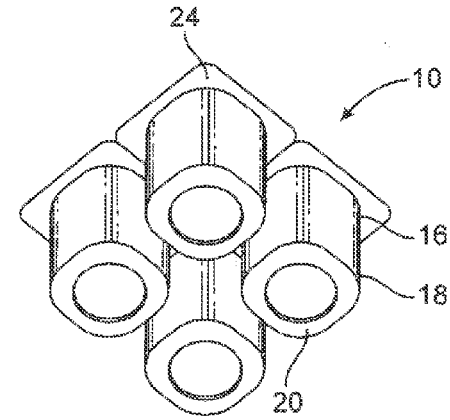
FIG. 4 is still another of the biopolymer article of FIG. 1 in accordance with one embodiment.

In describing the presently preferred embodiments and methods according to the invention, a number of terms will be used, the definitions or scope of which will now be described.

One or more embodiments include biopolymer resin, which is a user friendly biopolymer forming film formulated for use in a manner similar to more commonly used oil based materials such as PVC, APET, HIPS, etcetera. Thermoformable biopolymer (resins and resin blends) materials available today are typically produced solely for use on large commercial thermoforming equipment utilizing radiant heat technology. This type of heating provides consistent high-heat energy input which aids in controlling material distribution into the mold and therefore results in uniform parts. However, radiant heat may be impractical for use in form/fill/seal packaging applications. Radiant heat systems are energy intensive and require high voltage which is expensive. Radiant heat systems are also inherently unsafe when considering typical food packaging environments where exposure to water is common. These systems present risk to personnel and are also not wash-down classified.

End users of biopolymer resins produce thermoformed parts on a Form/Fill/Seal ("F/F/S") thermoforming machines that typically incorporate contact heaters. The heaters designs may vary but all are the same in that they impart the heat energy into the sheet prior to forming through direct contact. Direct contact heating is considered less desirable because it is generally more difficult to impart heat energy into the material as evenly and consistently as with radiant heat. Some machines incorporate a flat "sandwich" type contact heater that applies heat through the top and bottom of the sheet over nearly the entire area of a machine index length and width. Other similar machines may incorporate a single plate heater that only applies heat energy through either the top or bottom of the sheet. Other designs include what is called "Zone" heating, where only the formed pocket area (of multiple pockets per index) is heated. Still other designs may incorporate a combination of several of these plate designs at the same time.

Typical biopolymer forming films exhibit an extremely narrow process window that does not permit F/S/S machine operators sufficient control over material distribution and form quality. What is unique about biopolymer resins is that it is formulated to operate in a wide process window that permits the F/F/S machine operator control material distribution throughout the package in a manner that is typical for many petroleum based forming films without the high energy requirement of radiant heat.

As defined herein, the term "color concentrate" refers to a pelletized plastic material containing highly loaded pigments which are blended in precise amounts with a base resin or compound to achieve a predetermined final color.

As defined herein, the term "impact resistance" refers to the mean failure energy of materials (alternatively "MFE" expressed in in-lbs) according to the energy required to cause 50% of the specimens to crack or break flat, rigid plastic specimens under various specified conditions of impact of a striker impacted by a falling weight and is expressed as Gardner Impact values (i.e., MFE) as described in the associated ASTM Designation D 5420-04—Standard Test Method for Impact Resistance of Flat, Rigid Plastic Specimen by Means of a Striker Impacted by a Falling Weight (Gardner Impact) incorporated herein as one of the Attachments.

As defined herein, the term "bond strength" refers to the grams of force required to peel one inch wide strips of laminate as described in the 180 degree peel test applied to a one inch strip of laminate and is expressed as either grams, grams of force or grams per inch of pull as described in the associated ASTM test method Number F904-98.

As defined herein, the term "clear" refers to film or laminate without bubbles and is measured in Haze units as described in the associated ASTM Haze and Luminous test Number D1003-61.

As defined herein, the term "multilayered film", "multilayered films" "multilayered structure" or "one or more layers" refers to a plurality of layers in a single film or substrate structure generally in the form of a sheet or web which may be made from a polymer material, a non-polymer material, a bio-polymer material, some combination thereof or the like for example, bonded together by any conventional means known in the art (co-extrusion, extrusion coating, lamination, solvent coating, emulsion coating, suspension coating, adhesive bonding, pressure bonding, heat sealing, thermal lamination, ultrasonic welding, some combination thereof or the like for example).

As defined herein, the term "laminate" and the phrase "film laminate", when used as a noun, refers to the resulting product made by bonding together two or more substrates, layers or other materials. "Laminate", "Lamination", "laminated" and "thermally laminated" when used as a verb, means to affix, bond, join, connect or adhere (by means of extrusion, co-extrusion, extrusion coating, lamination, solvent coating, emulsion coating, suspension coating, adhesive bonding, pressure bonding, heat sealing, thermal lamination, ultrasonic welding, some combination thereof or the like for example of two or more layers so as to form a multilayered film or structure.

As defined herein, the term "polymer" refers to the product of a polymerization reaction, and is inclusive of homopolymers, copolymers, terpolymers, or the like for example, the layers of a film or film substrate can consist essentially of a single polymer, or can have still additional polymers together therewith, i.e., blended therewith.

As defined herein, the term "copolymer" refers to polymers formed by the polymerization of at least two different monomers. For example, the term "copolymer" includes the co-polymerization reaction product of ethylene and an .alpha.-olefin, such as 1-hexene. The term "copolymer" is also inclusive of, for example, the co-polymerization of a mixture of ethylene, propylene, 1-propene, 1-butene, 1-hexene, and 1-octene. As defined herein, a copolymer identified in terms of a plurality of monomers, e.g., "propylene/ethylene copolymer", refers to a copolymer in which either a monomer may co-polymerize in a higher weight or molar percent than the other monomer or monomers. However, the first listed monomer preferably polymerizes in a higher weight percent than the second listed monomer.

As defined herein, the term "coextruded" refers to a material formed by the process of extruding two or more polymeric materials through a single die with two or more orifices arranged so that the extrudates merge and weld together into a laminar structure before chilling and solidifying. The film substrates described herein may be generally prepared from dry resins which are melted in an extruder and passed through a die to form the primary film material, most commonly in tube or sheet form. In the coextruded films described herein, all layers were simultaneously coextruded, cooled via water, chilled metal roll, or air quenching. Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the film, by blending prior to extrusion. The resins and any additives are introduced to an extruder where the resins are melt plasticized by heating and then transferred to an extrusion (or co-extrusion) die for formation into a tube or any other form using any suitable extrusion method. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

As defined herein, the term "polyolefin" refers to homopolymers, copolymers, including having a methylene linkage between monomer units which may be formed by any method known to those skilled in the art. Examples of polyolefins include polyethylene (PE), low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, ionomers, polyethylenes comprising ethylene/.alpha.-olefin which are copolymers of ethylene with one or more .alpha.-olefins (alpha-olefins) such as butene-1, hexene-1, octene-1, or the like as a comonomer, and the like.

As defined herein, the term "ionomer" refers to metal-salt, e.g., sodium, zinc, neutralized ethylene acrylic or methacrylic acid copolymers.

As defined herein, the term "polyester" refers to homopolymers or copolymers having an ester linkage between monomer units which may be formed, for example, by condensation polymerization reactions between a dicarboxylic acid and a glycol. The ester monomer unit can be represented by the general formula: [RCO.sub.2R'] where R and R'=alkyl group. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. An example of preferred polyester is polyethylene terephthalate copolymer.

As defined herein, the term "nylon" refers to polyamide homopolymers, copolymers, or terpolymers having an amide linkage between monomer units which may be formed by any method known to those skilled in the art. The nylon monomer can be presented by the general formula: [CONH] or [CONR] where R=alkyl group. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here.

As defined herein, the terms "heat-seal", "heat-sealing", "heat-sealable", and the like refer to a first portion of a film surface (i.e., formed from a single layer or multiple layers) capable of forming a fusion bond to a second portion of a film surface. A heat-seal layer is capable of fusion bonding by conventional indirect heating means which generate sufficient heat on at least one film contact surface for conduction to the contiguous film contact surface and formation of a bond interface there between without loss of the film integrity. Heat-sealing can be performed by any one or more of a wide variety of manners, such as using a heat-seal technique (e.g., melt-bead sealing, thermal sealing, impulse sealing, ultrasonic welding, hot air, hot wire, infrared radiation, and the like).

As defined herein, the phrase "surface layer" as applied to film layers of the present invention refers to any layer that is capable of having at least a portion of one of its principal surfaces directly adhered to another layer of the film laminate.

As defined herein, the terms "join', "joins" and "adheres" are used in their broad sense to mean two formerly separate portions of a single laminate or one or two layers of a substrate which are connected together either by folding the laminate or layer onto itself thereby defining an edge or by bonding at least a portion of two layers together with an adhesive or by other means known to those skilled in the art.

As defined herein, the term "adhesive" refers to a flexible adhesive formed of a solvent or water based, polyurethane or polyester/polyether materials or the like, including dry bond, wet bond, gravure, reverse gravure, mayer rod, rollcast, serving a primary purpose or function of adhering two surfaces to one another. In the present invention, the adhesive may adhere one layer to another layer. Adhesives can be applied through direct gravure or reverse gravure coating. Reverse gravure provides a much clearer adhesive layer, however, very good results were attained using standard direct gravure coating as well. Exemplary adhesives include the LA1150-52 adhesive available from the Henkel Corporation of Cary, N.C., the L49x159 solvent based polyurethane adhesives or the Mor-Free 75-164 solventless polyurethane adhesives available from Dow Chemical.

As defined herein a "polymer sheet" refers to a material composed of polymers and having a thickness of about 10 MILs (0.01 inches) or greater, while a 'polymer film" is defined as a material composed of polymers and having a thickness of less than 10 MILs (0.01 inches).

As defined herein, the term "rigid" refers to a material capable of holding or retaining its original shape of form or returning to its original shape or form under return to initial conditions and is substantially firm in final form.

As defined herein the term "biodegradable" refers to material which, when exposed to an aerobic and/or anaerobic environment, ultimately results in the reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological or any other natural activity.

Nonlimiting examples of other optional ingredients that may be included in the film or laminate described herein include aromatic/aliphatic polyester copolymers made more readily hydrolytically cleavable, and hence more likely biodegradable, such as those described in U.S. Pat. Nos. 5,053,482; 5,097,004; 5,097,005 and 5,295,985, biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Slip agents may be used to help reduce the tackiness or coefficient of friction in the film. Also, slip agents may be used to improve film stability, particularly in high humidity or temperatures.

FIGS. 1-4 depict views of a biopolymer article (a form-fill-sealed article), generally designated 10, in accordance with one embodiment. In one embodiment, the article 10 is formed via any suitable manner including coextrusion, blow molding, thermoforming and the like.

In the embodiment illustrated in FIGS. 1-4, article 10 comprises four cups 12 (alternatively referred to as a 4-pack), arranged in two rows of two, where each cup 12 has a longitudinal sidewall 14, having first end 16 and second end 18, and bottom 20 at second end 18 (best viewed in FIG. 4) defining compartment or chamber 22 (best viewed in FIG. 3) adapted to receive a material (yogurt or other foodstuffs/materials). The cup 14 may have a depth to width ratio of 10:1 to 2:1; and/or scored for separation into individual compartments. In at least one embodiment, cup 12 has 4 longitudinal sidewalls 14 (two sets of two opposing sidewalls 14) joined or connected to bottom 20.

FIGS. 1-4 further illustrate cup 12 having a lip, flange or strip 24 at end 16, joining the individual cups 12 together. In at least one embodiment, the 4-pack 10 is formed as a single article, then the lip 24 is cut and scored (forming score lines 26 for example) into a multi-compartment, breakaway cups as is well known in the art. In the illustrated embodiment, the star punch 28 is formed, enabling easy separation of the individual cups 12. In at least one embodiment, article 10 includes lidstock 30 sealing compartment or chamber 22 (See FIG. 1-2).

Figure 5:
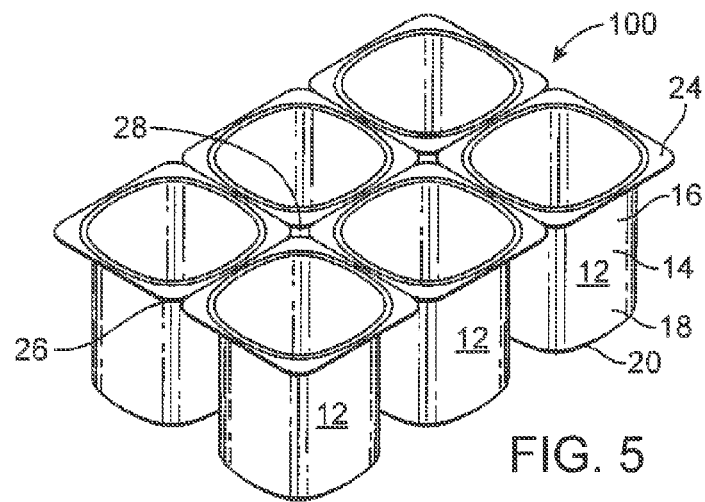
FIG. 5 is a view of another biopolymer article in accordance with one embodiment.
Figure 6:
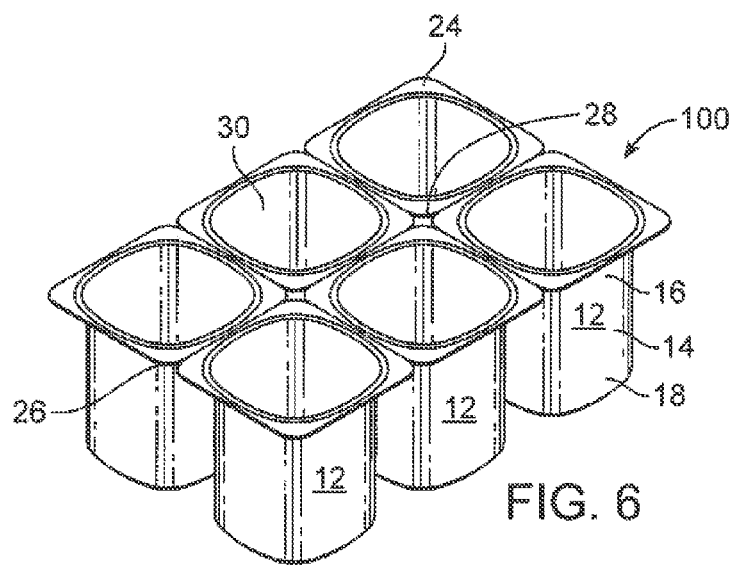
FIG. 6 is another view of the biopolymer article of FIG. 5 in accordance with one embodiment.
Figure 7:
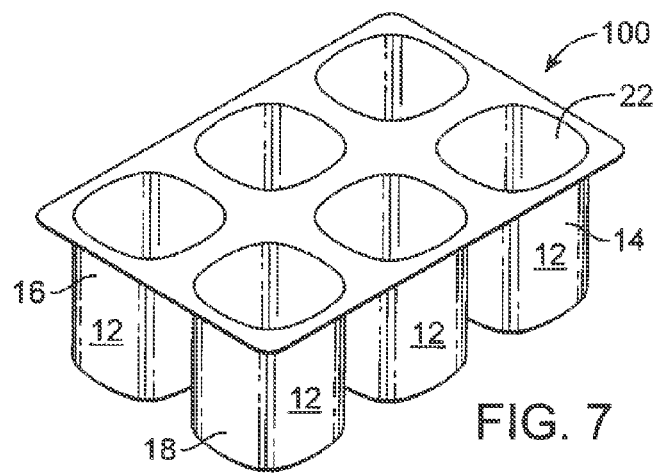
FIG. 7 is another view of the biopolymer article of FIG. 5 in accordance with one embodiment.

FIGS. 5-7 depict another view of a biopolymer article, generally designated 100, in accordance with one embodiment. In one embodiment, the article 100 is formed via any suitable manner including injection molding, blow molding, thermoforming and the like. In the embodiment illustrated in FIGS. 5-7, article 100 comprises six cups 12 (alternatively referred to as a 6-pack), arranged in two rows of three, where each cup 12 has a longitudinal sidewall 14, first and second ends 16 & 18, and bottom 20 defining compartment or chamber 22 adapted to receive a material (yogurt or other foodstuffs/materials) and lip 24.

Figure 8:
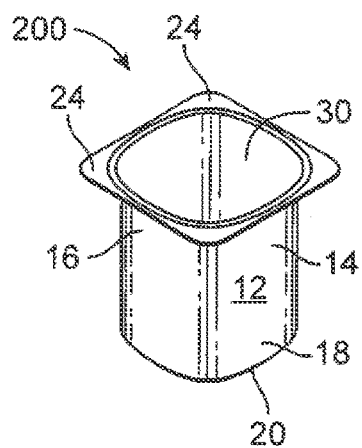
FIG. 8 is a view of yet another biopolymer article in accordance with one embodiment.
Figure 9:
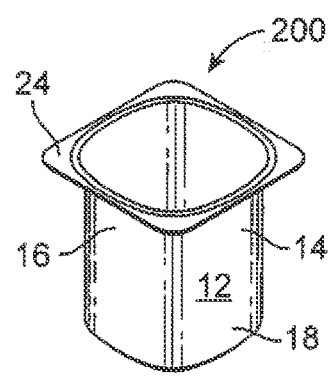
FIG. 9 is another view of the biopolymer article of FIG. 8 in accordance with one embodiment.
Figure 10:
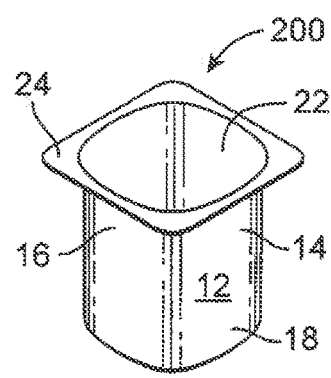
FIG. 10 is another view of the biopolymer article of FIG. 8 in accordance with one embodiment.

FIGS. 8-10 depict another view of a biopolymer article, generally designated 200, in accordance with one embodiment. In one embodiment, the article 200 is formed via any suitable manner including injection molding, blow molding, thermoforming and the like. In the embodiment illustrated in FIGS. 8-10, article 200 comprises a single cup 12 having a longitudinal sidewall 14, first and second ends 16 & 18 and bottom 20 defining compartment or chamber 22 adapted to receive a material (yogurt or other foodstuffs/materials) and lip 24.

Figure 11:
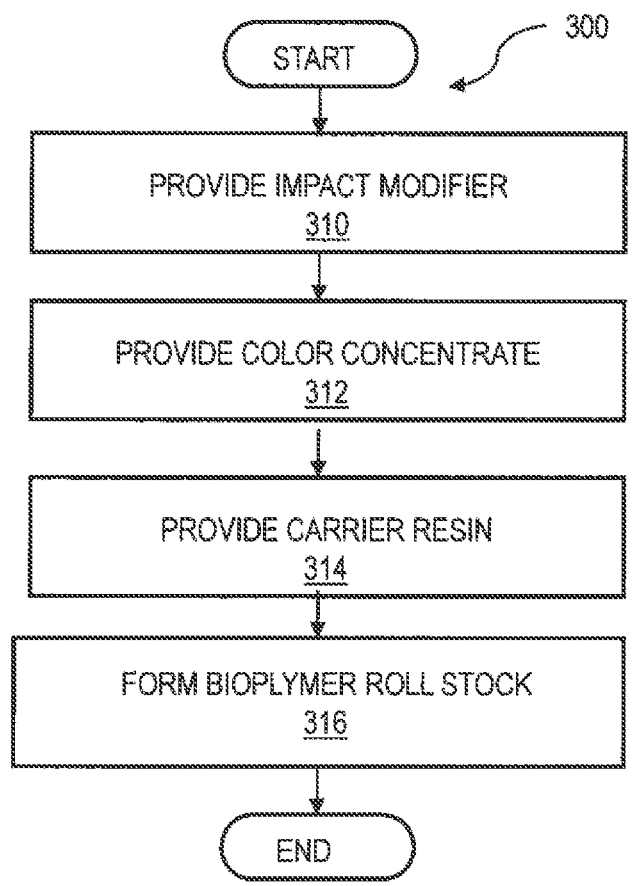
FIG. 11 is a flowchart of a method for forming biopolymer roll stock in accordance with one embodiment.
Figure 12:
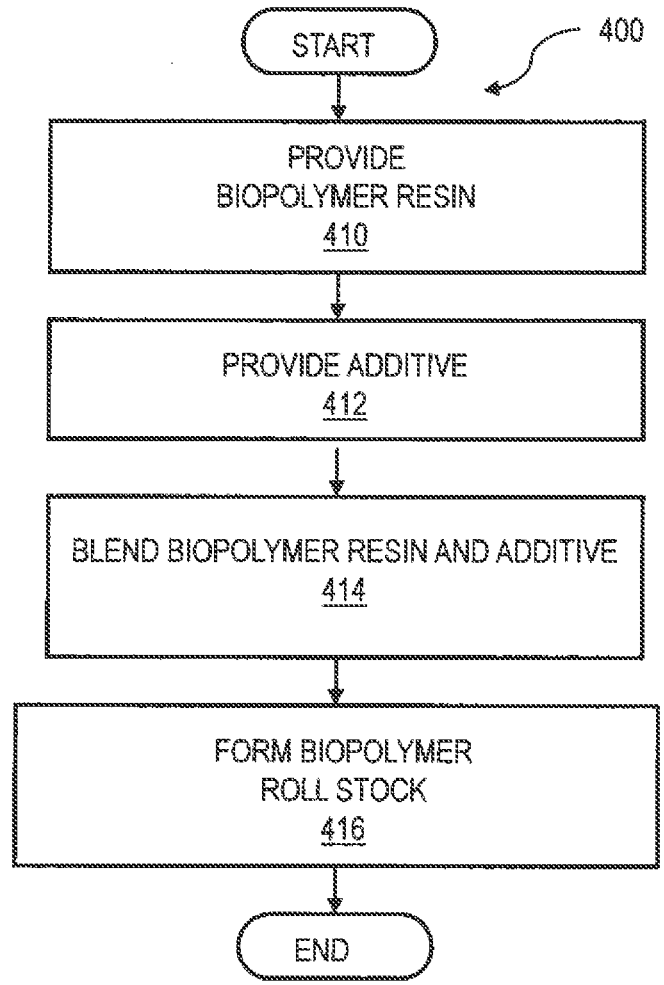
FIG. 12 is a flowchart of a method for forming biopolymer roll stock in accordance with one embodiment.

FIG. 11 is a flowchart of a method for forming a biopolymer roll stock, generally designated 300. Method 300 includes providing a biopolymer resin, block 310, providing a color concentrate, block 312, and providing a carrier resin, block 314. Method 300 further includes forming the biopolymer roll stock, block 316. In one or more embodiments, the biopolymer roll stock may be used to form a biopolymer form-fill-sealed article.

One embodiment of method 300 includes at least one biopolymer resin; and at least one additive, the additive including at least one impact modifier between 5-50 weight % of the total weight of the additive; and at least one polymer color concentrate between 5-50 weight % of the total weight of the additive, whereby the biopolymer roll stock has a predetermined thickness and impact resistance.

FIG. 129 is a flowchart of a method for forming a biopolymer roll stock, generally designated 400. Method 400 includes providing a biopolymer resin, block 410, and the additive, block 412. Method 400 further includes blending the biopolymer resin and the additive, block 414, and forming the biopolymer roll stock, block 416.

One embodiment of method 400 includes at least one biopolymer resin; and at least one additive, the additive including at least one impact modifier between 5-50 weight % of the total weight of the additive; and at least one polymer color concentrate between 5-50 weight % of the total weight of the additive, whereby the biopolymer roll stock has a predetermined thickness and impact resistance.

Yet another embodiment of method 400 includes at least one biopolymer resin; and at least one additive. The additive includes at least one impact modifier between 10-90 weight % of the total weight of the additive; and at least one polymer/dye compounded in a carrier resin between 10-90 weight % of the total weight of the additive, whereby the biopolymer roll stock has a predetermined thickness and impact resistance.

Figure 13:
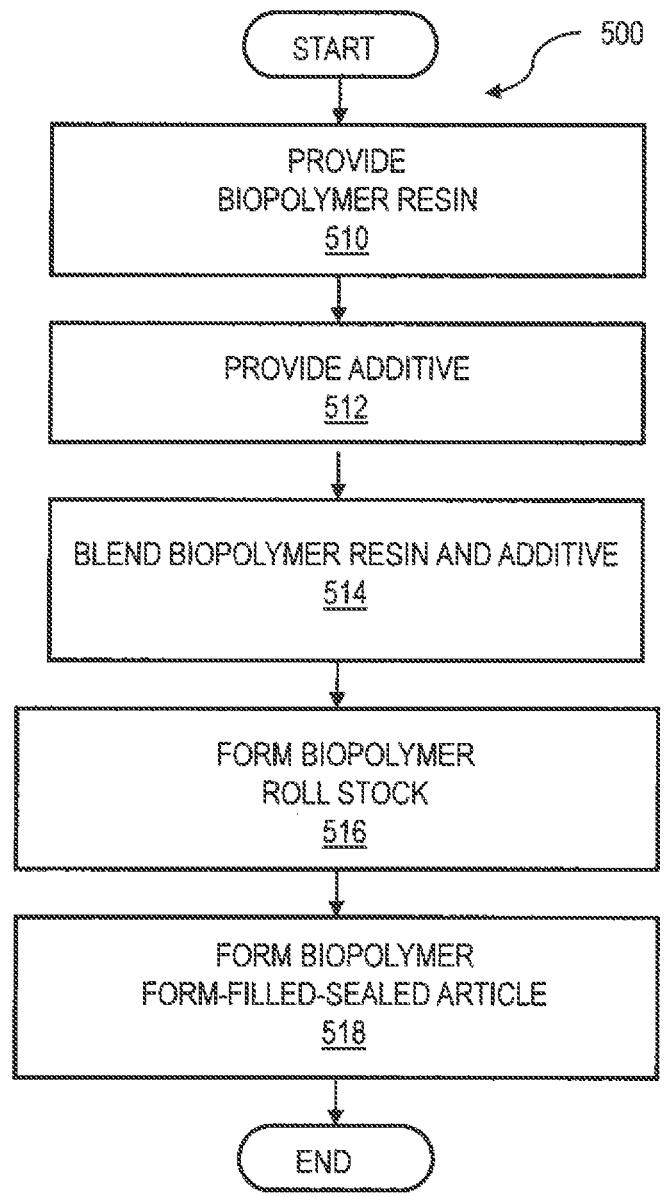
FIG. 13 is a flowchart of a method for forming a biopolymer form-filled-sealed article using biopolymer roll stock similar to that of FIG. 12 in accordance with one embodiment.

FIG. 13 is a flowchart of a method for forming a biopolymer form-filled-sealed package or article, generally designated 500, using a biopolymer roll stock. Method 500 includes providing a biopolymer resin, block 510, providing the additive, block 512, and blending the biopolymer resin and the additive, block 514. Method 500 further includes forming the biopolymer roll stock, block 516 and forming the biopolymer form-fill-sealed package or article.

One embodiment of method 500 includes at least one biopolymer resin; and at least one additive, the additive including at least one impact modifier between 5-50 weight % of the total weight of the additive; and at least one polymer color concentrate between 5-50 weight % of the total weight of the additive, whereby the biopolymer roll stock has a predetermined thickness and impact resistance.

One embodiment of method 500 further includes at least one biopolymer resin between 75-92 weight % (alternatively 70-90 weight %) of the total weight percent of the biopolymer form filled sealed package; and at least one additive between 8-25 weight % of the total weight percent of the biopolymer form filled seal. The at least one additive may include at least one impact modifier between 5-50 weight % of the total weight of the additive; at least one polymer color concentrate between 5-50 weight % of the total weight of the additive; and at least one carrier resin between 10-90 weight % of the total weight of the additive; whereby the biopolymer form-fill-seal package has a predetermined thickness, impact resistance and a predetermined depth to width ratio within a predetermined temperature window.

In one or more embodiments provided previously, the biopolymer roll stock include the at least one impact modifier is an ethylene copolymer and/or the at least one polymer color concentrate is $TiO_2$ based.

Yet one or more embodiments provided previously include the at least one carrier resin is a material selected from the group consisting of polylactic acid polymer (PLA), aliphatic-aromatic polyesters polymers, poly (3-hydroxyalkanoate) polymer (PHA), polycaprolactone and functionalized polylactic acid; and/or the biopolymer resin is a material selected from the group consisting of polylactic acid polymer (PLA), aliphatic-aromatic polyesters polymers, and poly (3-hydroxyalkanoate) polymer (PHA).

Embodiments the predetermined thickness of the biopolymer roll stock is between about 10 MILs and 80 MILs. Further, the biopolymer roll stock may be comprised of at least two layers of materials. The at least two layers of materials maybe comprised of the same material; are comprised of different materials; are comprised of different biopolymer materials or are comprised of biopolymer material and non-biopolymer material. Other embodiments include joining the biopolymer sheeting to at least one other sheeting material.

One or more embodiments include the predetermined impact resistance has a Gardner Impact value between 3 and 30 in-lbs (greater than 17 in-lb for example). More specifically the predetermined impact resistance has a Gardner Impact value of about 17 in-lbs @ 30 MILs. In at least one embodiment, the roll stock/article has a Shard Test value of about 0.

Embodiments are contemplated in which the roll stock includes the at least one biopolymer resin between 70-90 weight % of the total weight of the roll stock, the at least one impact modifier is between 5-15 weight % of the total weight of the roll stock, the at least one polymer color concentrate is between 5-15 weight % of the total weight of the roll stock and the at least one carrier resin is between 5-10% of the total weight of the roll stock.

In one embodiment, the biopolymer roll stock is a monolayer or multilayer sheet, and is used as a single sheet or has another sheet joined thereto. The biopolymer roll stock is between about 10 MILs and 80 MILs thick, more particularly between about 12 MILs and 50 MILs thick and has a predetermined temperature forming window between 180° F. and 350° F., more particularly between 220° F. and 275° F. In at least one embodiment, the article has a range of depth to width ratios of between 10:1 to 1:4, where embodiments are contemplated having ranges of depth to width ratios of between 10:1 to 2:1, ranges of depth to width ratios of between 8:1 to 4:1. and ranges of depth to width ratios of between 2:1 to 1:4, and may be scored for separation into individual compartments.

In one embodiment, the biopolymer roll stock has a predetermined impact resistance, MFE or energy that will cause 50% of the specimens to fail or crack or break the roll stock under various specified conditions as provided previously and in the associated ASTM Designation D 5420-04—

Standard Test Method for Impact Resistance of Flat, Rigid Plastic Specimen by Means of a Striker Impacted by a Falling Weight (Gardner Impact) incorporated herein as one of the attachments. In one embodiment, the biopolymer roll stock has a Gardner Impact value greater than 3 in-lbs, more particularly between 3 and 200 in-lbs or 3 and 150 in-lbs, and even still more particularly about 17 in-lbs @ 30 mil as provided below in Table 1.

TABLE 1

| Test Number | Item | Gauge MILS | Gardner Impact 70° F. In-lbs | Gardner Impact −30° F. In-lbs |
|---|---|---|---|---|
| 1 | Control PLA (5% Process Aide) | 30 | 2 | 2 |
| 2 | 90% PLA 5% Impact modifier 5% Color Additive | 18 | 16.9 | 12.4 |
| 3 | 90% PLA 5% Color Additive 5% Impact Modifier | 15 | 30 | |
| 4 | 96% PLA 4% Impact Modifier | 14 | 4.8 | |
| 5 | 95% PLA 5% Impact Modifier | 14 | 7.1 | |
| 6 | 90% PLA 10% Impact Modifier | 14 | 11.1 | |
| 7 | 100% PLA | 14 | 2.0 | |
| 8 | 95% PLA 5% Color Additive | 14 | 2.0 | |
| 9 | 90% PLA 5% Color Additive 5% Impact Modifier | 14 | 17.4 | |
| 10 | 85% PLA 5% Color Additive 10% Impact Modifier | 14 | 18.8 | |
| 11 | 80% PLA 10% Color Additive 10% Impact Modifier | 14 | 21.0 | |
| 12 | 90% PLA 5% Color Additive 5% Impact Modifier | 14 | 18.2 | |
| 13 | 90% PLA 5% Color Additive 5% Impact Modifier | 10 | 20.4 | |
| 14 | 90% PLA 5% Color Additive 5% Impact Modifier | 15 | 16.3 | |
| 15 | 90% PLA, 5% Color Additive 5% Impact Modifier | 20 | 20.8 | |
| 16 | 90% PLA 5% Color Additive 5% Impact Modifier | 25 | 27.7 | |
| 17 | 90% Repro PLA, 5% Color Additive 5% Impact Modifier | 30 | 42 | |
| 18 | 90% Repro PLA, 5% Color Additive 5% Impact Modifier | 30 | 40 | |
| 19 | 90% Repro PLA, 5% Color Additive 5% Impact Modifier | 15 | 29.1 | |
| 20 | 90% Repro PLA, 5% Color Additive 5% Impact Modifier | 30 | 44 | |
| 21 | 90% Repro PLA, 5% Color Additive 5% Impact Modifier | 30 | 44 | |
| 22 | 90% Repro PLA, 5% Color Additive 5% Impact Modifier | 30 | 36 | |

Repro PLA means reprocessed PLA or PLA sheeting that was cut up, cleaned and converted into flake so it can be recycled. The data in the Table I indicates that the impact strength of the control sheeting (Test #1) is 0.13 to 0.03 in*lbs/mil. However, the data further indicates that the impact strength of the biopolymer roll stock including the impact modifier and polymer color concentrate is 1.3 to 2.0 in*lbs/mil, an order of magnitude greater than the control roll stock.

Figure 14:
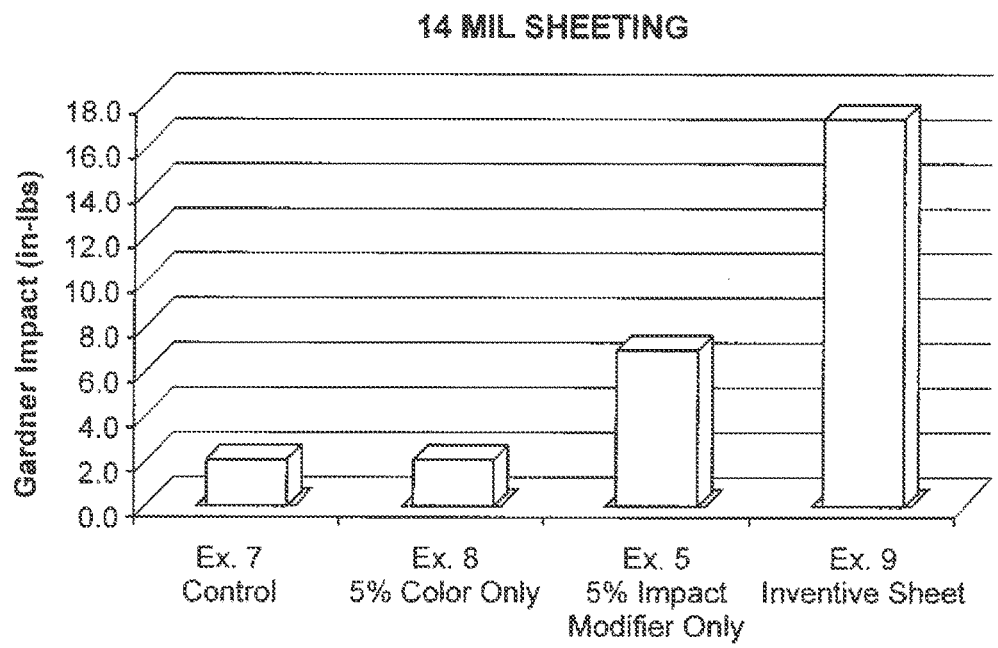
FIG. 14 is a graph showing the impact resistance (expressed as Gardner Impact values in in-lbs) for different compositions of biopolymer article/roll stock having a gauge of 14 MILs.
Figure 15:
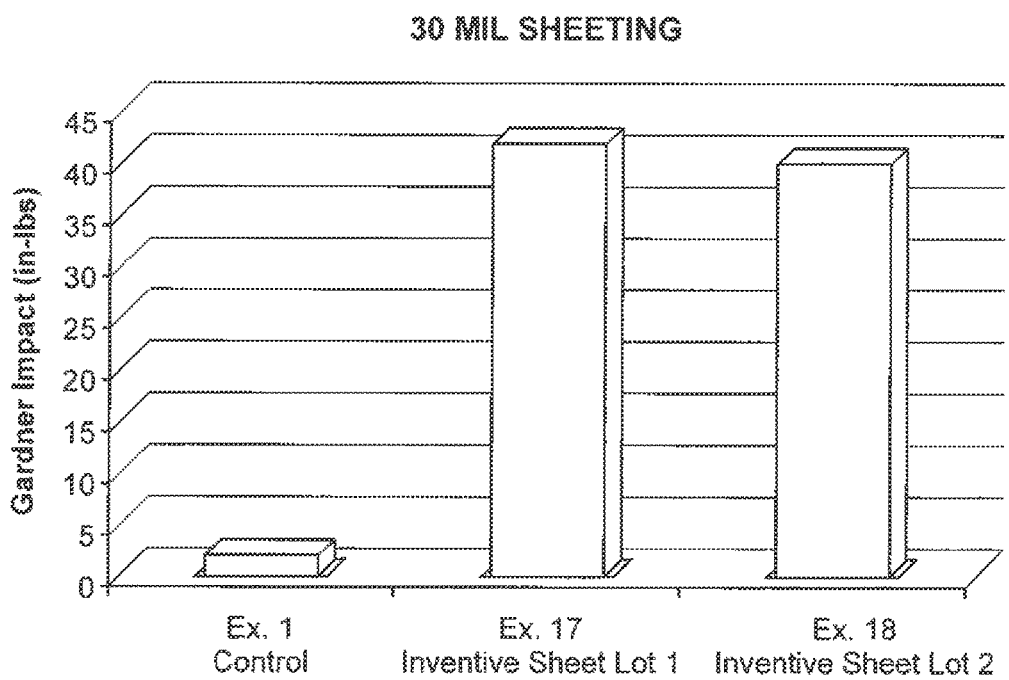
FIG. 15 is a graph showing the impact resistance (expressed as Gardner Impact values in in-lbs) for different compositions of biopolymer article/roll stock having a gauge of 30 MILs.

FIG. 14 is a graph showing the impact resistance (expressed as Gardner Impact Values in in-lbs) for different compositions of biopolymer roll stock having a gauge of 14 MILs; while FIG. 15 is a graph showing the impact resistance for different compositions of biopolymer roll stock having a gauge of 30 MILs. Thus it is clearly evident that a biopolymer roll stock including at least one biopolymer resin; at least one impact modifier and at least one polymer color concentrate (Samples 9, 17 and 18 in the Tables and Figures, where, in at least one embodiment, the polymer color concentrate includes, or is compounded in, a carrier resin (a functionalized carrier resin for example) is stronger than the control biopolymer roll stock, the biopolymer roll stock including just an impact modifier, or the biopolymer roll stock including just a polymer (such as a polymer color) by almost an order of magnitude. As provided previously, the biopolymer roll stock is a monolayer or multilayer material, and is used as a single material or has one or more materials joined or applied thereto. In at least one embodiment, the biopolymer roll stock may be comprised of at least two layers of materials, where the two layers are comprised of the same or different materials. For example, the at least two layers of materials may be comprised of the same or different biopolymer materials or one or more layers comprised of biopolymer material and one or more layers comprised of non-biopolymer material. Additionally, it is contemplated that other materials may be joined or blended with the biopolymer material, in addition to the impact modifier and color concentrates. For example, one or more different biopolymer materials, one or more non-biopolymer materials or some combination thereof may be combined with, or compounded in, the biopolymer resin (a functionalized carrier resin for example), which in turn is blended with the at least one impact modifier and at least one polymer color concentrate forming the biopolymer roll stock.

In one or more of the embodiments provided previously, the biopolymer form-filled-sealed package or article (or the roll stock) may be subject to a Shard Test. The Shard Test includes chilling or cooling the package or article using cold or ice water, coolant, refrigeration, and the like. The package or article is then separated into one or more sub-packages (cups) along the score line. The subpackage or cup is then manually or visually tested for shards. In at least one embodiment, the cup has a Shard Test value of 0 (no shards) or about 0 (few shards).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A biopolymer roll stock, the biopolymer roll stock comprising:
   a biopolymer resin present in an amount between 80 and 90 wt % of the total weight of the biopolymer roll stock, the biopolymer resin comprising polylactic acid; and
   an additive, the additive comprising:
   an ethylene acrylate copolymer impact modifier present in an amount between 5 and 10 wt % of the total weight of the biopolymer roll stock; and
   a polymer color concentrate present in an amount between 5 and 10 wt % of the total weight of the biopolymer roll stock,
   wherein the polymer color concentrate comprises an aliphatic-aromatic polyester polymer comprising adipic acid, terephthalic acid, and 1,4-butanediol monomers.

2. A biopolymer roll stock, the biopolymer roll stock comprising:
   a biopolymer resin present in an amount between 75 and 92 wt % of the total weight of the biopolymer roll stock, the biopolymer resin comprising polylactic acid; and
   an additive present in an amount between 8 and 25 wt % of the total weight of the biopolymer roll stock, the additive comprising:
   an ethylene acrylate copolymer impact modifier present in an amount between 50 and 67 wt % of the total weight of the additive; and
   a pigment/dye compounded in a carrier resin, the pigment/dye and carrier resin present in a total amount between 33 and 50 wt % of the total weight of the additive;
   wherein the carrier resin comprises an aliphatic-aromatic polyester polymer comprising adipic acid, terephthalic acid, and 1,4-butanediol monomers.

3. The biopolymer roll stock of claim 1, wherein the polymer color concentrate comprises $TiO_2$.

4. The biopolymer roll stock of claim 1, wherein the biopolymer roll stock has a thickness between about 10 MILs and 80 MILs.

5. The biopolymer roll stock of claim 2, wherein the biopolymer roll stock is comprised of at least two layers of materials and the at least two layers of materials are comprised of the same material.

6. The biopolymer roll stock of claim 2, wherein the biopolymer roll stock is comprised of at least two layers of materials and the at least two layers of materials are comprised of different materials.

7. The biopolymer roll stock of claim 6 wherein the at least two layers of materials are comprised of biopolymer material and non-biopolymer material.

8. The biopolymer roll stock of claim 2, wherein the biopolymer roll stock has an impact resistance between 3 and 30 in-lbs, as measured by the Gardner Impact Test.

9. The biopolymer roll stock of claim 2, wherein the biopolymer roll stock has a thickness between about 10 MILs and 80 MILs.

10. The biopolymer roll stock of claim 2, wherein the biopolymer roll stock forms a form-fill-sealed article at a temperature ranging from 180° F. to 350° F.

11. The biopolymer roll stock of claim 10, wherein the form-fill-sealed article has a depth to width ratio between 10:1 to 2:1.

12. The biopolymer roll stock of claim 2, wherein the pigment/dye comprises $TiO_2$.

13. The biopolymer roll stock of claim 1, wherein the biopolymer roll stock has an impact resistance of between 3 and 30 in-lbs, as measured by the Gardner Impact Test.

14. The biopolymer roll stock of claim 2, wherein the biopolymer resin is present in an amount between 80 and 90 wt % of the total weight of the biopolymer roll stock.

* * * * *